United States Patent Office 3,478,099
Patented Nov. 11, 1969

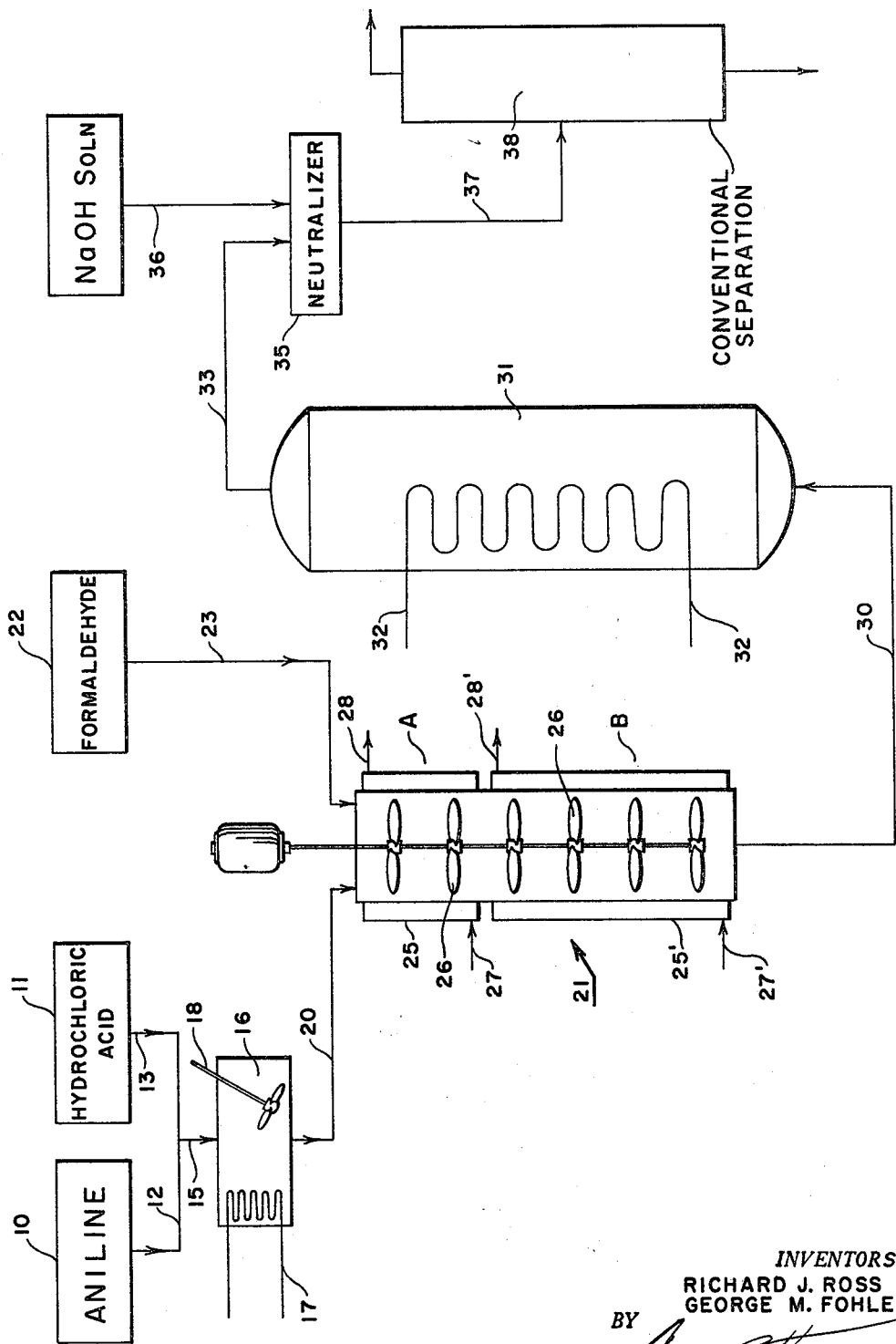

3,478,099
PROCESS FOR PRODUCING METHYLENE-DIAMILINES
Richard J. Ross, Walnut Creek, and George M. Fohlen, Millbrae, Calif., assignors to Kaiser Aluminum & Chemical Corporation, Oakland, Calif., a corporation of Delaware
Continuation of application Ser. No. 348,103, Feb. 28, 1964. This application Sept. 9, 1966, Ser. No. 594,954
Int. Cl. C07c 87/50
U.S. Cl. 260—570                                 9 Claims

ABSTRACT OF THE DISCLOSURE

A continuous process for producing poly primary aromatic amines from aniline and formaldehyde comprising admixing a strong mineral acid such as hydrochloric acid and aniline, to neutralize the aniline (at least about 20% thereof) to form the corresponding aniline-acid salt, continuously violently mixing the aniline-acid admixture with the aldehyde at a temperature not over the boiling point of any of the constituents for a short time, withdrawing the resultant reaction mixture to a second reaction zone and maintaining it there with gentle agitation at from about 80° to 105° C. until the aniline is substantially all reacted, withdrawing from the second reaction zone and neutralizing with an alkali metal hydroxide to form the alkali metal salt of the acid and to recover a water-immiscible organic phase containing the amine condensation product.

---

This application is a continuation of application Ser. No. 348,103, filed Feb. 28, 1964.

This invention relates to a process for the production of poly primary amines; and more particularly, it relates to a continuous process for producing such products by condensation of an aldehyde and an aromatic primary amine such as aniline.

Polyamines are useful materials in their own right and can be prepared in the form of resinous materials that can be generally classified as plastics. However, the poly-primary amines have recently been particularly useful as intermediates in the formation of poly-isocyanates which in turn are useful in the production of polyurethanes. For this particular purpose poly-primary amines are particularly beneficial in that phosgenation of such primary amines will result in the desirable polyisocyanate product that is useful in polyurethane production. The poly-primary amines that are especially useful, are those containing from at least about 20% diamine, and substantially all of the rest, if any, higher condensation products, such as the triamine and tetramine. In the condensation of mononuclear aromatic primary amine, e.g. aniline, and an aldehyde, the product will hereinafter be termed "diamine," e.g. as when two molecules of aniline condense with formaldehyde to form $NH_2 \cdot C_6H_4 \cdot HCH \cdot C_6H_4 \cdot NH_2$. Similarly when three molecules of aniline condense with two molecules of formaldehyde the product is termed herein "triamine,"

$$NH_2 \cdot C_6H_4 \cdot CH_2 \cdot (NH_2) \cdot C_6H_3 \cdot CH_2 \cdot C_6H_4 \cdot NH_2$$

Also in a similar manner, when four molecules of aniline condense with three molecules of formaldehyde the product is termed the "tetramine," and so on. Such condensation products are herein termed, broadly, poly-primary amines. In other words, polyamines according to the present invention are the poly-primary amines wherein the condensation is effected through a hydrogen on a nuclear or ring carbon. Of such polyamines, the diamines are preferably condensed through the para position with respect to the amine portion of the aromatic primary amine molecule. To obtain such nuclear condensation it has hitherto been found necessary in processes where preliminary mixing of reactants has been done under neutral or mildly acidic conditions, to maintain the reaction product of aniline, for example, and the aldehyde at a high temperature and in a strong acid environment for a prolonged period of time, e.g. for over five hours, thereby rearranging the molecules so that they change to primary amines connected through the aromatic nucleus rather than the nitrogen atom.

In many former proposed processes, the acidified formaldehyde was mixed with the aniline and there ensued an uncontrollable reaction, due to the combined exothermic effects of neutralization and also of the condensation reaction. In fact, the concentration of resinous materials in such processes becomes so great in some instances that the entire reaction product was solid. This is a great disadvantage where further specific reactions are desired; and, for instance, phosgenation to a desired polyisocyanate is not then feasible. Products made by prior art batch-wise processes have a larger proportion of the higher condensation products for a given aniline-aldehyde ratio than the product made in a continuous fashion according to the present invention. Formerly, for instance, the acidified aldehyde was added gradually to the aniline and the later portions of the aldehyde could react with some condensation products in the mixture as well as with some unreacted aniline.

The present invention provides a process which largely mitigates or completely avoids the above-mentioned difficulties. The process of the present invention is at such a controlled rate that it can be effected continuously without any substantial formation of undesired end products, such as resinous materials. Additionally, the process of this invention is maintained effected rapidly with the condensation reactions being largely directly on the nucleus so that little rearranging reaction is required. Even further, the reaction of this invention is selective, and can be controlled to convert a major portion of the aniline to the valuable primary diamine rather than to a more random distribution of polymers that is typical of and a disadvantage of prior art processes.

The process of the present invention comprises first mixing or blending aniline with an aqueous strong mineral acid, preferably hydrochloric acid. Sufficient acid is admixed to react with at least a portion or with all of the aniline to form aniline hydrochloride. Preferably, for best operation of the process, there is admixed sufficient acid to so react with from about 20 to about 70 mol percent of the aniline. In a preferred operation, the admixture so formed has a pH of about from 3.5 to 4.5. In one embodiment of this invention there is admixed with the aniline-acid mixture a neutral organic liquid which has a solvent action on the components of the reacted mass, such as a hydrocarbon, chlorinated hydrocarbon or the like, in an amount up to about 10 parts per 100 parts aniline, which has been found advantageous in some modes of operation in maintaining all components in solution and preventing undesired precipitation of any component on the walls of the system as the reaction proceeds in the continuous process.

The aniline-acid blend, with or without a neutral organic liquid, is then rapidly and thoroughly mixed with the aldehyde in a first-stage reaction zone which is cooled and provided in any desired manner, with means for insuring thorough intermixing and contact between the various ingredients. The temperature in the first reaction zone tends to rise because the reaction effected therein is exothermic and cooling usually is provided to maintain a suitable temperature. However, no critical temperature exists for the reaction as long as it is maintained below the boiling point of any of the reactants or reaction products therein. Preferably, the temperature maintained in the first reaction zone is from 20° C. to 100° C. The reaction mixture is suitably held in the first zone for from about 15 seconds to about 2 minutes with intimate intermixing of the ingredients during the whole period. In order to ensure thorough mixing, violent agitation is preferably effected in this stage. In carrying out the reaction in one embodiment it is advantageous that the inlet for the formaldehyde, for example, be so arranged that it is maintained out of contact with the liquid in this zone to avoid plugging of such tube which tends to occur because of the rapidity with which these components react.

The effluent from the first reaction zone is passed to a second reaction zone. In this zone, gentle agitation is sufficient. The second reaction zone is provided to give the reactions time to go to completion. In the first reaction zone several side reactions, i.e. other than coupling of two anilines by a methylene group, such as reaction through one or both of the amine nitrogens of the aniline molecules, for instance, take place to a small extent. The resultant molecule, of the last-mentioned reaction, a secondary amine, is rearranged to form the desired poly-primary amine in the presence of an acid medium is permitted a suitable holding period. Another product issuing from the first reaction zone is an aminobenzyl alcohol or polymers thereof. These latter products when maintained or held in an acid medium in the second reaction zone condense and rearrange to form the desirable poly-primary amines and this reaction, too, goes substantially to completion in the holding period in the second reaction zone. Such holding is maintained until the admixture shows no further reaction of or reduction in the amount of aniline. This is easily determined by testing a sample of the reaction mixture in the known manner for free aniline. When substantially no further reduction in the amount of free aniline is shown, the rearrangement or second-stage reaction of the present invention is completed. Under the preferred conditions shown herein, such holding period is about one hour. However, regardless of the manner in which the reactions take place, it has been found that employing the sequence of process steps described and claimed herein will produce the desirable result of converting aniline and an aldehyde substantially completely to the poly primary amine condensation product.

The second reaction zone is maintained at a temperature of from 80° C. up to boiling point of the mixture, preferably at from 80° C. to 105° C. The reactions effected therein have been found to be slightly endothermic and a small amount of heat is therefore supplied to the reaction zone. Following the residence time in the second reaction zone, the reaction product issuing from the second zone is neutralized and separated into its component phases by conventional means. In other words, at the end of this reaction or rearrangement step, the reaction mass is neutralized by addition of caustic soda which causes formation of a two-phase system composed of an aqueous phase and an organic phase, and the desired products are recovered from this system in the conventional manner. Suitably, there is added to the effluent from the second reaction zone sufficient aqueous NaOH to react with the HCl, mostly present in the form of polyamine hydrochloride, and to form sodium chloride which dissolves in the water of the aqueous phase. The two-phase system is treated in any desired manner to separately recover the desired polyamine product. In one embodiment, the two-phase system issuing from this zone is subjected to steam distillation to strip off unreacted aniline and the remaining material comprises an organic phase containing principally poly-primary amine and an aqueous phase containing NaCl. Advantageously, a suitable organic liquid solvent as described hereinabove, e.g. monochlorbenzene, is admixed therewith to dissolve the poly-primary amine product, and the resultant two-phase system is separated, the aqueous phase being discarded. The organic phase so recovered can be suitably washed with water and the solvent is distilled off to recover the polyamines product as residue. If desired, the solution itself can be employed in further reactions.

Miscellaneous condensation reactions between aniline and an aldehyde in the presence of a strong mineral acid are effected so readily that runaway temperatures and uncontrolled reactions are difficult to avoid. This characteristic of the reactions in fact contributes largely to the difficulty of effecting a successful continuous commercial process for the production of poly-primary amines. The present invention provides such a continuous commercial process in that it controls the rate not only to promote the formation of poly-primary amines, but also to retard the undesirable secondary reactions.

In the present invention, a continuous process is provided wherein aniline and acid are first pre-mixed and the heat of neutralization thus produced is dissipated prior to effecting the reaction between aniline and aldehyde. Thus, in the first reaction zone only one exothermic reaction is effected and temperature control is substantially easier to maintain.

Employing the preferred range of neutralization of aniline also is advantageous in providing a successful continuous process. It has been found that when 20 to 70 mol percent of the aniline is neutralized prior to mixing aldehyde, the diamine is formed in the para position thereby producing the desirable para di-primary amine. If less than 20 mol percent of the aniline is neutralized with acid in the reaction mixture, the reaction rate with aldehyde is slow; and when more than 70 mol percent of the aniline is neutralized there is greater tendency to early precipitation of the aniline salt, causing operational difficulties.

The aldehydes that can be employed in this invention are those normally used in producing polyamines and are preferably the lower molecular weight aliphatic water soluble aldehydes, i.e. containing less than 8 carbon atoms, and aromatic aldehydes and mixtures of these with each other. By way of example only, such aldehydes as formaldehyde, acetaldehyde, propionaldehyde, butyraldehyde, valeraldehyde, benzaldehyde and furfuraldehyde can be employed.

In another aspect this invention includes modifying the product composition by regulating the ratio of reactants. The amount of diamine in the product can be controlled by regulating the ratio of aldehyde to aniline. Thus, in the specific case of aniline and formaldehyde, when the mol ratio of aniline to formaldehyde is 4 to 1.9 or 2.1:1, a product containing 70 wt. percent diamine is obtained while when the ratio of aniline to formaldehyde is 4 to 3.2 or 1.25:1, the product will contain about 10 wt. percent diamine. Thus it is preferred to employ a mol ratio of aniline to formaldehyde of from 1.25:1 to 2.1:1, in this specific mode of operation employing these two reactants.

The accompanying drawing is a schematic representation of one specific embodiment of the invention in the production of the poly primary amine by the condensation of aniline and formaldehyde, to be described in conjunction with the drawing, and both the drawing and the process are intended herein as being illustrative only of the invention.

The embodiment illustrated herein will be described in regard to the preferred reactants of this invention, aniline and formaldehyde. A container 10 for aniline and a container 11 for hydrochloric acid discharge through lines 12 and 13 respectively and join in line 15 which passes to a blender 16. The blender contains a cooling means illustrated as coil 17 through which flows a cooling medium such as water, and an agitator 18 to insure that the material in the vessel 16 is thoroughly mixed and blended. The aniline-hydrogen chloride mixture of the composition described above produces heat of neutralization which is removed in the cooling water, and the mixture is maintained in this example at a temperature of less than 40° C. Cooling can also be effected or temperature controlled by introducing cold starting materials into blender 16 so that the heat of neutralization will bring the temperature of the mixture up to that desired. However, a high or boiling temperature in the mixture passing from the vessel 16 desirably is avoided.

The aniline-acid mixture is passed from vessel 16 through line 20 into the top of first-stage reactor 21. Formaldehyde from a storage vessel 22 is passed through line 23 into the top of first-stage reactor 21. It is preferred that the formaldehyde be introduced in such manner, e.g. through a vapor gap, that it does not react with the acidified aniline at the point of entry, because solids may form there to block the pipe mouth. In this embodiment, reactor 21 is an in-line mixer which may amount to substantially no more than a small diameter pressure vessel or even a large pipe with jackets 25, 25′ and provided with means for introducing and removing a cooling medium shown as 27, 27′ and 28, 28′ respectively. The mixing means 26 provided in reactor 21 is shown schematically here as a motor-driven series of impellers. However, other means of creating conditions of turbulent flow can be employed.

In this embodiment, the first zone, A, of reactor 21 is a preferably mixing zone wherein the aniline-containing admixture and the formaldehyde are rapidly and vigorously mixed and the temperature in this zone is maintained at not over about 40° C., to retard reaction until the ingredients have been thoroughly interdispersed. The cooling jacket is therefore preferably provided with its own inlet and outlet means to enable thorough cooling and temperature control as desired. The residence time in this zone, in the continuous process is very short, not usually exceeding about 10 seconds. The mixture then is conducted, or flows, onward to the next portion of reactor 21, shown in the drawing as zone B, wherein vigorous agitation is also effected, e.g. by means of impellers 26, and where the temperature is maintained, for instance, at about 60° C. to 70° C. The residence time in reactor 21 is between 70 and 75 seconds on the average in this embodiment. The cooling medium flowing through jacket 25′ is sufficient to maintain the temperature constant at any level lower than the temperature at which methanol will boil from the mixture in the methanol is an ingredient of the formaldehyde stream, formaldehyde being generally used in the form of formalin which is a solution of methanol, water and formaldehyde. Alternatively, reactor 21 can be formed as a two-stage system having an initial mixing stage in which the aniline-acid stream is thoroughly and violently blended with the formaldehyde stream and is then conducted to a longer contacting stage in which intermixing and contact is less vigorous or more gentle.

The reaction product passing through line 30 from the reactor 21 will consist largely of the poly-primary amines but it will contain some secondary amine, some alcohol, some unreacted aniline, formaldehyde and hydrochloric acid. This reaction mixture passing through line 30 enters secondary reactor 31 which has sufficient capacity to provide the stream with a residence time of at least one-half hour. The reactor 31 is also provided with a heating means 32 in that the final reactions effected in reactor 31 are slightly endothermic. The temperature in this reactor preferably is maintained at 95–100° C. which is readily accomplished, e.g. by passing steam through the heating means 32 at slightly superatmospheric pressure and at a sufficient rate to maintain the temperature at the desired level, or by steam injection, if desired. The final reactions effected in the secondary reactor 31 have a time-temperature relationship and are effected more quickly at a higher temperature. The second reaction zone can also function at higher temperature when under superatmospheric pressure.

reactor 31 through line 33 passes to a neutralizer 35 into which sodium hydroxide is introduced through line 36. In the neutralizer, the hydrochloric acid is neutralized by the caustic soda to form sodium chloride and the mixture of organic reaction products and aqueous brine passes through line 37 to conventional separation means shown schematically at 38. The aqueous brine solution formed by neutralizing hydrochloric acid with sodium hydroxide solution causes separation out of the poly-primary amine product along with any unreacted aniline and organic solvents that are employed so that the separation of the aqueous phase from the organic phase is readily effected. The further separation processes described above are conventional in the art of recovering the poly amine condensation product of aniline and formaldehyde by previously known methods and will not be described in further detail herein.

As a specific example of the process of this invention, an aniline hydrochloride feed was prepared by mixing 39.4 parts by weight of 20° Bé. aqueous HCl and 60.6 parts by weight aniline. To this mixture 5 parts by weight of monochlorobenzene were added and the mixture was cooled to 37° C.

The other reactant employed was formaldehyde which was used in the commercially available form known as formalin, a blend of about 37% by weight formaldehyde, 8–12% by weight methanol and the remainder water, but formaldehyde free of methanol is preferred, for greater ease of operation.

The aniline-acid solvent mixture was pumped into a mixing zone where it was violently mixed with formaldehyde with a high speed impeller for 7 seconds and at a temperature of not over 40° C., and then passed to first reactor or reaction zone where a rotating rod maintained turbulence and good mixing for an additional 40 seconds. A water jacket surrounding the first reaction zone was regulated to maintain the temperature constant as indicated in Table I.

The effluent from the first reaction zone was passed to a second reaction zone which was jacketed to heat it with steam and maintain the temperature in the reaction zone at 95° to 100° C. and which had sufficient capacity to hold the effluent from the first reaction zone for a period of approximately one hour. At the end of this period about 3–12%, based on total weight of reactor effluent, of unreacted aniline remained in the reaction mixture.

With the product from the second reaction zone there is admixed a sufficient amount of strong aqueous NaOH solution to react with all of the HCl present to form NaCl and preferably to bring the reaction mixture to a pH of from 8.5 to 11.0. At this time, the reaction mass or mixture separates into two liquid phases, of which one is an aqueous phase and one is an organic phase. The water-soluble components, principally sodium chloride, go into the water phase; and the organic phase contains substantially all of the desired polyamine products, any organic liquid solvent which may have been added, which solvent in this example is monochlorbenzene, any unreacted aniline and any other component soluble in the solvent. The water and organic phases are separately recovered in any desired manner and are further worked up as desired. In particular, the polyamine product is recovered as described hereinabove.

In a series of tests carried out as described above wherein the mol ratio of aniline to formaldehyde and the temperature in the first reaction zone are varied as described in Table I below, and the other conditions are as set forth in the example above, the very good yield of diamine, $NH_2 \cdot C_6H_4 \cdot CH_2 \cdot C_6H_4 \cdot NH_2$, in this continuous and rapid process is clearly demonstrated. The remainder of the final product consists essentially of triamine and tetramine.

TABLE 1

| Mol ratio Aniline:Formaldehyde | First reactor, temp., °C. | Diamine, wt. percent of final product |
|---|---|---|
| 1.95:1 | 51 | 63.9 |
| 1.95:1 | 60 | 61.7 |
| 1.56:1 | 52 | 50.5 |
| 1.56:1 | 60 | 55.0 |
| 1.56:1 | 72 | 51.7 |
| 1.44:1 | 52 | 43.1 |
| 1.44:1 | 60 | 47.6 |
| 1.44:1 | 72 | 42.8 |

As indicated by the table a higher ratio of aniline to aldehyde has been found to result in an increased amount of diamine in the product. The total polyamine product is suitable for many uses, for example, for suitable reaction to produce isocyanates, or as rubber additives, curing agents for epoxy resins, etc.

By the present process the two reactants are introduced into the reaction zone in certain proportions, as defined herein, thereby enabling controllable production of the condensation products in the desired distribution, or relative amounts. Furthermore, the present process enables addition of the reactants in the desired proportions or ratios instantaneously and in a continuous manner.

In the present specification and claims, the term "aniline" is intended to include aniline itself, $NH_2 \cdot C_6H_5$, and also substituted anilines wherein nuclear or ring hydrogen is substituted by a halogen or a low molecular weight aliphatic group which does not intefere with the condensation reaction, for example, ortho-toluidine, o-chloroaniline, trifluoromethyl aniline, halogenated aniline. It is also to be understood that although the above specific description has been given with respect to hydrochloric acid, other aqueous strong acids such as nitric or sulfuric acid, can alternatively be employed. Other devices than those specifically described herein can be used for carrying out the reactions of this invention. The reactions can be carried out at atmospheric pressures, but, if desired, increased or superatmospheric pressures can be suitably employed; but it is generally economical and advantageous to carry out the process at atmospheric pressure. In the neutralization of the effluent from the second reaction zone, caustic alkali or alkali metal hydroxide other than caustic soda can be employed, e.g., potassium hydroxide, ammonium hydroxide or sodium carbonate, but NaOH is economical and advantageous in ease of use and is preferred. In this specification and claims, percentages given are by weight unless otherwise specified. Other mean of ensuring thorough intermixing of the various components than those specifically shown herein can be employed. Other apparatus, e.g. a continuous pipe system or tubular reactor provided with suitable control means and if desired turbulent flow means can alternatively be employed.

Having now described the invention, what is claimed is:

1. In a continuous process for the production of poly primary aromatic amine condensation product from aniline and formaldehyde, the steps which comprise admixing aqueous strong mineral acid and aniline, said acid being admixed in an amount sufficient to neutralize at least about 20% of said aniline to form the corresponding aniline-acid salt, admixing the resultant aniline-acid admixture with formaldehyde in a first reaction zone with continuous violent mixing at a temperature not over the boiling point of any of the constituents of the reaction zone, maintaining said aniline-acid admixture in said first reaction zone with volent agitation for a period of from about 15 seconds to about 2 minutes, withdrawing the resultant reaction mixture from said first reaction zone as effluent and passing to a second reaction zone, maintaining said reaction mixture in said second zone with gentle agitation until substantially no further reaction of aniline occurs, maintaining the temperature of said second zone at from about 80° C. to about 105° C., withdrawing the reaction mixture from said second reaction zone as effluent, and admixing therewith an alkali metal hydroxide to react with all of the said mineral acid present to form the alkali metal salt thereof and to form an aqueous phose and a water-immiscible organic phase and separately recovering said organic phase.

2. A process as in claim 1 wherein first reaction zone is maintained at a temperature of from 20° C. to 100° C.

3. A process as in claim 1 wherein said second reaction zone is maintained at a temperature of from 95° C. to 100° C.

4. Processes as in claim 1 wherein the mol ratio of aniline to formaldehyde is from 1.25:1 to 2.1:1.

5. A process as in claim 1 wherein the effluent from said second reaction zone is neutralized with aqueous sodium hydroxide solution.

6. A continuous process for the production of poly primary aromatic amine condensation product from aniline and formaldehyde which comprises admixing aqueous hydrochloric acid and aniline, said acid being admixed in an amount sufficient to neutralize from about 20 mol percent to about 70 mol percent of said aniline to form aniline hydrochloride, incorporating in said mixture from 2.5 to 5.0 parts monochlorbenzene per 100 parts aniline, introducing said admixture into a first reaction zone, introducing into said first reaction zone an amount of formaldehyde to provide a mol ratio of said aniline to said formaldehyde from 1.25:1 to 2.1:1, thoroughly and violently intermixing said reactants and maintaining the temperature in said reaction zone at between 20° C. and 100° C., maintaining said reactants in said first reaction zone with violent agitation for a period of from about 15 seconds up to about two minutes, withdrawing the resultant reaction mixture from said first reaction zone as effluent and passing to a second reaction zone, maintaining the reaction mixture in said second reaction zone with gentle agitation for a period of from ½ hour to 2 hours, maintaining the temperature in said second reaction zone at from 80° C. to 105° C., withdrawing the resultant mixture from said second reaction zone as effluent, admixing a strong aqueous sodium hydroxide solution with said reaction mixture from said second zone to react with all of the hydrogen chloride contained therein and to provide a pH therein of from 8.5 to 11.0 and to form an aqueous phase and a water-immiscible organic phase, and separately recovering said organic phase, and recovering poly primary amines from said organic phase.

7. In a continuous process for producing poly primary aromatic amine condensation product from aniline and formaldehyde, the steps which comprise admixing aqueous hydrochloric acid and aniline, said acid being admixed in an amount sufficient to neutralize from about 20 mol percent to about 70 mol percent of said aniline to form aniline hydrochloride, introducing said admixture into a mixing zone, introducing into said mixing zone with violent agitation, an amount of formaldehyde to provide a mol ratio of aniline to formaldehyde of from 1.25:1 to 2.1:1, maintaining the resultant mixture in said mixing zone at not over about 40° C., rapidly conducting said resultant mixture to a first reaction zone and there thoroughly intermixing said reactants with continuous violent agitation, maintaining the temperature of said first reaction zone at below the boiling point of any component therein, maintaining said reactants in said reaction zone for from about 15 seconds to about 2 minutes, passing the resultant reactant mixture from said first reaction zone to a second reaction zone, maintaining the reaction mixture in said second reaction zone with gentle agitation at a temperature of from 80° C. to 105° C. for a period of from ½ hour to 2 hours, and withdrawing the reacted mixture from said second reaction zone.

8. A process as in claim 1 wherein said first reaction zone comprises an initial mixing stage and a second, contacting stage and wherein a stream of said aniline-acid salt admixture is thoroughly and violently blended with a formaldehyde stream in said initial stage, and said blended stream is then conducted to said second stage wherein intermixing is less vigorous.

9. Process as in claim 8 wherein said acid is hydrochloric acid and is admixed in an amount to neutralize from 20% to 70% of said aniline.

References Cited
UNITED STATES PATENTS 3,260,751   7/1966   Powers et al. _____ 260—570

ROBERT V. HINES, Primary Examiner

U.S. Cl. X.R.

23—260; 252—401; 260—2, 47, 72.5, 77.5, 393, 347.7, 453, 575, 807

UNITED STATES PATENT OFFICE
CERTIFICATE OF CORRECTION

Patent No. 3,478,099                      November 11, 1969

Richard J. Ross et al.

It is certified that error appears in the above identified patent and that said Letters Patent are hereby corrected as shown below:

In the heading to the drawings and in the heading to the printed specification, in the title, "METHYLENEDIAMILINES" should read -- METHYLENEDIANILINES --. Column 3, line 9, "cantact" should read -- contact --; line 38, "is" should read -- if --. Column 4, line 32, "or" should read -- of --. Column 5, line 59, "the", second occurrence, should read -- that --. Column 6, after line 14, insert as the beginning of a new paragraph, -- The final reaction mixture passing from secondary --. Column 8, line 2, "volent" should read -- violent --; line 14, "phose" should read -- phase --.

Signed and sealed this 24th day of November 1970.

(SEAL)
Attest:

EDWARD M. FLETCHER, JR.              WILLIAM E. SCHUYLER, JR.
Attesting Officer                   Commissioner of Patents